United States Patent [19]

Engelhardt et al.

[11] Patent Number: 4,794,166

[45] Date of Patent: Dec. 27, 1988

[54] PROCESS FOR THE PREPARATION OF A HYDROGEL WHICH IS LARGELY FREE FROM MONOMERS

[75] Inventors: Friedrich Engelhardt, Frankfurt; Manfred Schrod, Weiterstadt; Manfred Ziegelmayer, Bischofsheim; Josef Hilbig, Taunusstein; Reinhard Dönges, Bad Soden, all of Fed. Rep. of Germany

[73] Assignee: Cassella Aktiengesellschaft, Frankfurt, Fed. Rep. of Germany

[21] Appl. No.: 77,803

[22] Filed: Jul. 27, 1987

[30] Foreign Application Priority Data

Aug. 30, 1986 [DE] Fed. Rep. of Germany ....... 3629611
Oct. 17, 1986 [DE] Fed. Rep. of Germany ....... 3635367

[51] Int. Cl.$^4$ ............................................... C08F 6/00
[52] U.S. Cl. ................................ 528/492; 523/315; 523/332; 524/833; 524/916; 528/493; 528/495; 528/496; 528/499
[58] Field of Search ............... 524/833, 916; 523/315, 523/332; 528/495, 496, 499, 492, 493

[56] References Cited

U.S. PATENT DOCUMENTS

| | | | |
|---|---|---|---|
| 3,496,254 | 2/1970 | Wichterle | 523/106 |
| 3,499,862 | 3/1970 | Wichterle | 524/833 |
| 3,812,071 | 5/1974 | Stoy | 523/106 |
| 3,956,224 | 5/1976 | Chu | 524/916 |
| 4,123,406 | 10/1978 | Stoy et al. | 524/916 |
| 4,172,823 | 10/1979 | Stoy et al. | 524/916 |
| 4,173,606 | 11/1979 | Stoy et al. | 523/106 |
| 4,228,056 | 10/1980 | Stoy | 524/916 |
| 4,401,797 | 8/1983 | Gallop | 523/106 |
| 4,426,492 | 1/1984 | Steckler | 523/106 |
| 4,452,776 | 6/1984 | Refojo | 524/833 |
| 4,495,313 | 1/1985 | Larsen | 523/106 |
| 4,534,916 | 8/1985 | Wichterle | 523/106 |
| 4,546,123 | 10/1985 | Schafer et al. | 523/106 |
| 4,548,983 | 10/1985 | Yokota et al. | 523/106 |
| 4,625,001 | 11/1986 | Tsubakimoto et al. | 526/88 |
| 4,680,336 | 7/1987 | Larsen et al. | 524/916 |
| 4,687,816 | 8/1987 | Lin et al. | 523/106 |

*Primary Examiner*—Joseph L. Schofer
*Assistant Examiner*—J. M. Reddick
*Attorney, Agent, or Firm*—Connolly and Hutz

[57] ABSTRACT

A polymer hydrogel substantially free from monomers and oligomers is prepared by contacting a previously prepared polymer hydrogel with a single-phase mixture of water and a solvent and then separating the mixture of water and solvent from the hydrogel.

14 Claims, No Drawings

PROCESS FOR THE PREPARATION OF A HYDROGEL WHICH IS LARGELY FREE FROM MONOMERS

The invention relates to a process for the preparation of a hydrogel which is largely free from monomers and oligomers Hydrogels are water-containing gelatinous polymers or copolymers, for example based on polyacrylic acid, which, for example, are increasingly used, at least in the dried form, as so-called superabsorbents for absorbing liquids. Such superabsorbents are used, for example in nappy liners and the like, for collecting body fluids. The superabsorbents should be as free as possible from monomers and oligomers. Preparation of hydrogels which are free from monomers and oligomers by a particular procedure during the polymerization or copolymerization by itself usually cannot be achieved.

It has now been found, surprisingly, that the preparation of a hydrogel which is largely free from monomers and oligomers is made possible by bringing the hydrogel into contact with a single-phase mixture of water and a solvent and then separating the mixture of water and solvent from the hydrogel, the weight ratio of water to solvent preferably being chosen so that the hydrogel neither shrinks nor swells. After the mixture of water and solvent has been removed from the hydrogel, the hydrogel is usually dried or steamed, or steamed and dried.

Water-miscible solvents, that is to say those solvents which are miscible with water in all proportions, are particularly suitable for preparation of the single-phase mixture of water and solvent. Examples of such solvents which can be used are lower alcohols, such as, for example, methanol, ethanol, propanol and tert.-butanol, and furthermore lower ketones, dimethylformamide and the like. Isopropanol is preferably used as the solvent which is completely miscible with water. It is also possible to use a single-phase mixture of water with a solvent which is not miscible with water in all proportions, that is to say has a miscibility gap. Such solvents with a miscibility gap with water are, for example, n-butanol and i-butanol. It is also possible to use a single-phase mixture of water with several different solvents.

The preferred weight ratio of water to the solvent at which the hydrogel to be treated neither swells nor shrinks can easily be determined by preliminary experiments. The weight ratio between water and solvent used here depends on the properties of the particular hydrogel, which are influenced, in particular, by its chemical composition, its degree of polymerization or copolymerization and its degree of crosslinking.

In the preferred procedure, in which the hydrogel is brought into contact with a single-phase mixture of water and solvent in which the hydrogel neither swells nor shrinks, the comminuted hydrogel remains stirrable and can easily be separated off from the liquid phase.

It has been found that a single-phase mixture of water and solvent in many cases causes the hydrogel neither to swell nor shrink if the weight ratio of water:solvent=(20 to 85):(80 to 15), preferably (40 to 65):(60 to 35).

After the polymerization or copolymerization, the hydrogel used in the process according to the invention is usually comminuted, for example to a particle size of 0.5 to 15 mm, preferably 1 to 10 mm. This comminution is carried out in a manner which is known per se, for example in a mincer or kneader. After the comminution, the hydrogel is brought into contact with the single-phase mixture of water and solvent. This can be effected in various continuous or discontinuous ways which are known per se. For example, the hydrogel can be brought into contact with the single-phase mixture of water and solvent in a suitable container by stirring, and the hydrogel can then be removed in a suitable manner, for example on a filter, such as, for example, a band filter or a suction filter, in a decanter or centrifuge or in a mixer-settler. However, other known single- or multistage washing or extraction processes, in particular those which operate by the countercurrent principle, are also suitable for bringing the components into contact and then separating them.

The components can be brought into contact at normal temperature, but preferably at slightly elevated temperature, for example up to about 50° C., usually under normal pressure. During the separation, it may be advantageous or necessary to use reduced or increased pressure, depending on the device used.

The amount of single-phase mixture of water and solvent required for bringing the components into contact is advantageously kept as small as possible and can likewise be easily determined by preliminary experiments. In many cases, the weight ratio of hydrogel:(mixture of water and solvent) is 1:(0.5 to 10), preferably 1:(0.5 to 5) and especially preferably 1:(1 to 3).

If appropriate, the hydrogel can be brought into contact according to the invention with the single-phase mixture of water and solvent repeatedly several times, until the desired low content of monomers or oligomers in the hydrogel is reached, which can easily be determined by analytical investigations.

After the hydrogel has been brought into contact with the single-phase mixture of water and solvent under the preferred condition according to the invention, namely that the hydrogel neither swells nor shrinks, the hydrogel can easily be removed from the mixture of water and solvent without caking together or sticking of the filter cloths or the like occurring.

After the final removal of the mixture of water and solvent, the hydrogel purified in the manner according to the invention can be dried or steamed or steamed and dried in a manner which is known per se, for example on customary drying and/or steaming units, and further processed in the customary manner, for example further comminuted.

In the steaming process, the hydrogel still containing solvent is charged with steam, whereupon the solvent evaporates completely and can be removed under reduced pressure. This is of advantage for the drying which usually follows, since water drying instead of solvent drying can then be carried out.

The hydrogels required as starting substances can be prepared in a manner which is known per se by polymerization or copolymerization, in particular by the process of gel polymerization or bead polymerization. Aqueous solutions of monomeric acrylic acid or methacrylic acid and/or alkaline metal, ammonium or amine salts thereof and, if appropriate, other water-soluble polymerizable monomers, such as, for example, acrylamide, N-vinyl pyrrolidone and the like, are thereby polymerized or copolymerized, usually with the addition of a poly-olefinically unsaturated compound as a crosslinking agent. The polymerization is thereby started in the customary manner, for example by the action of high-energy radiation or the addition of initiators which form free radicals. Hydrogels which contain between 45 and 80% by weight of water and can be used in the process according to the invention, after comminution, are obtained in such a manner.

The hydrogels used in the process according to the invention usually contain 0.1 to 10% by weight (=1,000 to 100,000 ppm) of monomers. Depending on the hydrogel present and the mixture of water and solvent used, degrees of washing out of the monomers of 50 to more than 90% can already be achieved when the process according to the invention is used in a single stage. These degrees of washing out can be considerably improved by applying the process according to the invention several times or in a multi-stage procedure. The multiple or multi-stage application of the process according to the invention can also be carried out in a simple manner, for example by washing the hydrogel once or several times with the mixture of water and solvent on a filter or a suction filter.

The degree of washing out which can be achieved in one treatment stage depends on the chemical composition of the hydrogel, its residual content of monomers and oligomers and the mixture of water and solvent used.

By multiple application or a multi-stage procedure, it is possible to reduce the content of monomers to values below 200 ppm, in many cases to values below the detections limit. At the same time, oligomers and non-crosslinked polyacrylic acids and salts are largely washed out.

In the process according to the invention, the monomers and oligomers are washed out of the hydrogel rapidly. The degree of washing out which can be achieved in one treatment stage at normal temperature is in many cases already reached after 15 seconds to 30 minutes, preferably 30 seconds to 10 minutes of the hydrogel being brought into contact with the mixture of water and solvent. This time can usually be shortened by applying a slightly elevated temperature when the hydrogel and the mixture of water and solvent are brought into contact.

The preparation of suitable starting hydrogels is described, for example, in German Pat. No. A1-3,432,690 (corresponding to U.S. Pat. No. 4,625,001).

The following examples 1 to 4 relate to the preparation of hydrogels which are suitable as starting substances for the process according to the invention. Examples 5 to 21 relate to the procedure of the process according to the invention.

EXAMPLE 1

700 ml of completely demineralized water and 90 g of sodium carbonate are dissolved, with stirring, in a reactor vessel lined with polyethylene. 250 g of acrylic acid containing 1 g of dissolved trimethylolpropane triacrylate are then added slowly.

When the addition has ended, 0.5 g of dibutylamine hydrochloride, 0.25 g of ammonium peroxodisulphate and 0.25 g of p-toluenesulphinic acid, in the form of the sodium salt, are added to the reaction mixture.

At a starting temperature of 20° C., the polymerization starts in the course of 30 minutes, whereupon the temperature rises to about 90° C. A water-containing polymer gel is formed. The residual monomer content of acrylic acid in the hydrogel, determined by HPLC, is 8,200 ppm (=0.82% by weight).

EXAMPLE 2

In a repetition of Example 1, 69 g of sodium hydroxide are used instead of the sodium carbonate, 0.3 g of methylenebisacrylamide is used instead of the trimethylolpropane triacrylate, and 0.5 g of potassium peroxodisulphate and 1.0 g of sodium disulphite ($Na_2S_2O_5$) are used as the catalyst system.

The residual monomer content of the hydrogel thus obtained is 9,000 ppm (=0.9% by weight).

EXAMPLE 3

In a repetition of Example 1, 66.6 g of potassium carbonate are used instead of the sodium carbonate, 0.2 g of bisacrylamidoacetic acid is used instead of the trimethylolpropane triacrylate, and 0.25 g of potassium peroxodisulphate, 0.25 g of ammonium peroxodisulphate and 0.1 g of ascorbic acid are used as the catalyst system.

EXAMPLE 4

In a repetition of Example 1, 145 g of sodium bicarbonate are used instead of the sodium carbonate, 0.3 g of tetraallyloxyethane is used instead of the trimethylolpropane triacrylate, and 0.8 g of 2,2'-azobis-(2-amidopropane) dihydrochloride is used as the catalyst.

In the following examples, the monomer content in the mother liquors and in the treated hydrogel is determined by HPLC, and the degree of washing out in relation to the original monomer content is determined therefrom.

EXAMPLE 5

100 parts by weight of the hydrogel of Example 1 with a residual monomer content of 8,200 ppm are comminuted to a particle size of about 1 to 5 mm and mixed intensively by stirring with 200 parts by weight of a mixture of water and isopropanol in a weight ratio of 50:50 in a stirred vessel at room temperature for one minute. The mixture is then filtered on a suction filter under reduced pressure. The hydrogel can be filtered well and is easily removed from the filter cloth.

The treated hydrogel has a residual monomer content of 570 ppm, which corresponds to a degree of washing out of the monomers of 93%.

EXAMPLE 6

In a repetition of Example 5, a mixture of water and nbutanol in a weight ratio of 80:20 is used.

The treated hydrogel has a residual monomer content of 3,940 ppm, which corresponds to a degree of washing out of the monomers of about 52%.

EXAMPLE 7

In a repetition of Example 5, a mixture of water and nbutanol in a weight ratio of 80:20 is used. The resulting filter cake is washed with 100 parts by weight of a fresh mixture of water and n-butanol in a weight ratio of 80:20.

The treated hydrogel has a residual monomer content of 2,870 ppm, which corresponds to a degree of washing out of the monomers of 65%.

EXAMPLE 8

In a repetition of Example 5, a mixture of water and nbutanol in a weight ratio of 80:20 is used. The resulting filter cake is washed with 100 parts by weight of a fresh mixture of water and n-butanol. The resulting filter cake is then stirred intensively with 200 parts by weight of a fresh mixture of water and n-butanol in the stirred vessel for 3 minutes and subsequently filtered on a suction filter under reduced pressure, and the filter cake is washed with 100 parts by weight of a fresh mixture of water and n-butanol. The mixtures of water and n-butanol used in each case have a weight ratio of water:n-butanol of 80:20.

The treated hydrogel has a residual monomer content of 1,230 ppm, which corresponds to a degree of washing out of the monomers of 85%.

EXAMPLE 9

In a repetition of Example 5, a mixture of water and isopropanol in a weight ratio of 40:60 is used.

The treated hydrogel has a residual monomer content of 1,394 ppm, which corresponds to a degree of washing out of the monomers of 83%.

EXAMPLE 10

In a repetition of Example 5, a mixture of water and isopropanol in a weight ratio of 40:60 is used. The resulting filter cake is washed with 100 parts by weight of a fresh mixture of water and isopropanol in a weight ratio of 40:60.

The treated hydrogel has a residual monomer content of 574 ppm, which corresponds to a degree of washing out of the monomers of 93%.

EXAMPLE 11

In a repetition of Example 5, a mixture of water and isopropanol in a weight ratio of 40:60 is used. The resulting filter cake is washed with 100 parts by weight of a fresh mixture of water and isopropanol. The resulting filter cake is then stirred with 200 parts by weight of a fresh mixture of water and isopropanol in the stirred vessel for 3 minutes and subsequently filtered on a suction filter under reduced pressure, and the filter cake is washed with 100 parts by weight of a fresh mixture of water and isopropanol. The mixtures of water and isopropanol used in each case have a weight ratio of water:isopropanol of 40:60.

The treated hydrogel has a content of 250 ppm of acrylic acid, which corresponds to a degree of washing out of the monomers of about 97%.

EXAMPLE 12

In a repetition of Example 5, a mixture of water and isopropanol in a weight ratio of 60:40 is used. In this mixture, the hydrogel swells, which makes phase separation and filtration difficult.

EXAMPLE 13

In a repetition of Example 5, the filter cake thereby obtained is washed with 100 parts by weight of a fresh mixture of water and isopropanol in a weight ratio of 50:50. The entire treatment is then repeated, that is to say the filter cake is mixed intensively in the stirred vessel with fresh water/isopropanol mixture and filtered and the filter cake is washed with fresh water/isopropanol mixture. The mixtures of water and isopropanol used in each case have a weight ratio of water:isopropanol of 50:50.

The hydrogel thus treated has a residual monomer content below the detection limit of about 20 ppm, which corresponds to a degree of washing out of the monomers of at least 99.75%.

EXAMPLE 14

In a repetition of Example 5, the filter cake thereby obtained is washed three times with in each case 100 parts by weight of a fresh mixture of water/isopropanol in a weight ratio of 50:50.

The treated hydrogel has a residual monomer content of 246 ppm, which corresponds to a degree of washing out of the monomers of 97%.

EXAMPLE 15

100 parts by weight of the hydrogel of Example 1 with a residual monomer content of 8,200 ppm are comminuted to a particle size of about 1 to 5 mm, introduced onto a vacuum suction filter and washed once with 200 parts by weight and then three times with in each case 100 parts by weight of a 50% strength by weight aqueous isopropanol solution (weight ratio of water:isopropanol=50:50).

The treated hydrogel has a residual monomer content of 490 ppm, which corresponds to a degree of washing out of the monomers of 94%.

EXAMPLE 16

100 parts by weight of the hydrogel of Example 1 with a residual monomer content of 8,200 ppm are comminuted to a particle size of 1 to 12 mm, stirred with 500 parts by weight of a 50% strength aqueous isopropanol solution (weight ratio of water:isopropanol=50:50) in a kettle for 10 minutes and then pumped onto a continuously operated vacuum band filter. On the vacuum band filter, the hydrogel is washed and 50% strength isopropanol in countercurrent in three stages.

Free acrylic acid can no longer be detected as residual monomer in the hydrogel thus purified. The purification effect is already complete after the first washing stage. The content of extractable oligomers decreases from 14% by weight to below 4% by weight.

EXAMPLE 17

In a repetition of Example 16, only one washing stage is applied instead of the three washing stages, and in a subsequent stage the solvent-moist product is treated with steam. The alcohol is thereby completely removed from the hydrogel.

The treated hydrogel has a residual monomer content below the detection limit, and that of extractable oligomers decreased from 14% by weight to below 4% by weight.

EXAMPLE 18

100 parts by weight of the hydrogel of Example 2 with a residual monomer content of 9,000 ppm (=0.9% by weight) are comminuted to a particle size of 1 to 5 mm. 100 parts by weight of the comminuted hydrogel are mixed intensively by stirring with 200 parts by weight of a mixture of water and acetone in a weight ratio of 60:40 in a stirred vessel for 3 minutes at room temperature. The mixture is then filtered on a suction filter under reduced pressure. The hydrogel can be filtered well. The resulting filter cake is washed out with 100 parts by weight of fresh water/acetone mixture in a weight ratio of 60:40.

The treated hydrogel has a residual monomer content of 360 ppm, which corresponds to a degree of washing out of the monomers of 96%.

EXAMPLE 19

Example 18 is repeated, but a mixture of water and isopropanol in a weight ratio of 60:40 is used instead of the mixture of water and acetone.

The treated hydrogel has a residual monomer content of 1,170 ppm, which corresponds to a degree of washing out of the monomers of 87%.

EXAMPLE 20

Example 18 is repeated twice, but a mixture of water and isopropanol in a weight ratio of 60:40 is used instead of the mixture of water and acetone.

The treated hydrogel has a residual monomer content of 72 ppm, which corresponds to a degree of washing out of the monomers of 99.2%.

EXAMPLE 21

In a repetition of Example 20, a mixture of water and isopropanol in a weight ratio of $66\frac{2}{3}:33\frac{1}{3}$ is used. This mixture swells the hydrogel, so that filtration is made difficult.

What is claimed is:

1. A process for preparation of a hydrogel based on polyacrylic acid for use as superabsorbent substantially free from monomers and oligomers which comprises contacting a previously prepared hydrogel based on polyacrylic acid with a single-phase mixture of water and a solvent selected from group consisting of lower alcohol, lower ketone and dimethylformamide and then separating the hydrogel from the mixture of water and solvent.

2. A process according to claim 1 wherein the contact of the mixture of water and solvent is in countercurrent flow with the hydrogel.

3. A process according to claim 1 wherein the mixture of water and solvent has a weight ratio of water:solvent of (20 to 85):(80 to 15).

4. A process according to claim 1 wherein the mixture of water solvent has a weight ratio of water:solvent of (40 to 65):(60 to 35).

5. A process according to claim 1 wherein a mixture of water and a water-miscible solvent is used.

6. A process according to claim 1 wherein the solvent is a lower alcohol having 1 to 4 carbon atoms.

7. A process according to claim 1 wherein the solvent is isopropanol.

8. A process according to claim 1 wherein the solvent is n-butanol.

9. A process according to claim 1 wherein the solvent is acetone.

10. A process according to claim 1 wherein the weight ratio of water to solvent is such that the treated hydrogel neither shrinks nor swells.

11. A process according to claim 1 wherein the hydrogel is steamed, dried or both after the mixture of water and solvent has been separated from the hydrogel.

12. A process according to claim 1 wherein the previously prepared hydrogel is contacted with a mixture of water and solvent in a weight ratio of 1:(0.5 to 10).

13. A process according to claim 12 wherein the weight ratio is 1:(0.5 to 5).

14. A process according to claim 12 wherein the weight ratio is 1:(1 to 3).

* * * * *